C. H. INMAN.
INTERNAL COMBUSTION ENGINE.
APPLICATION FILED AUG. 17, 1909.

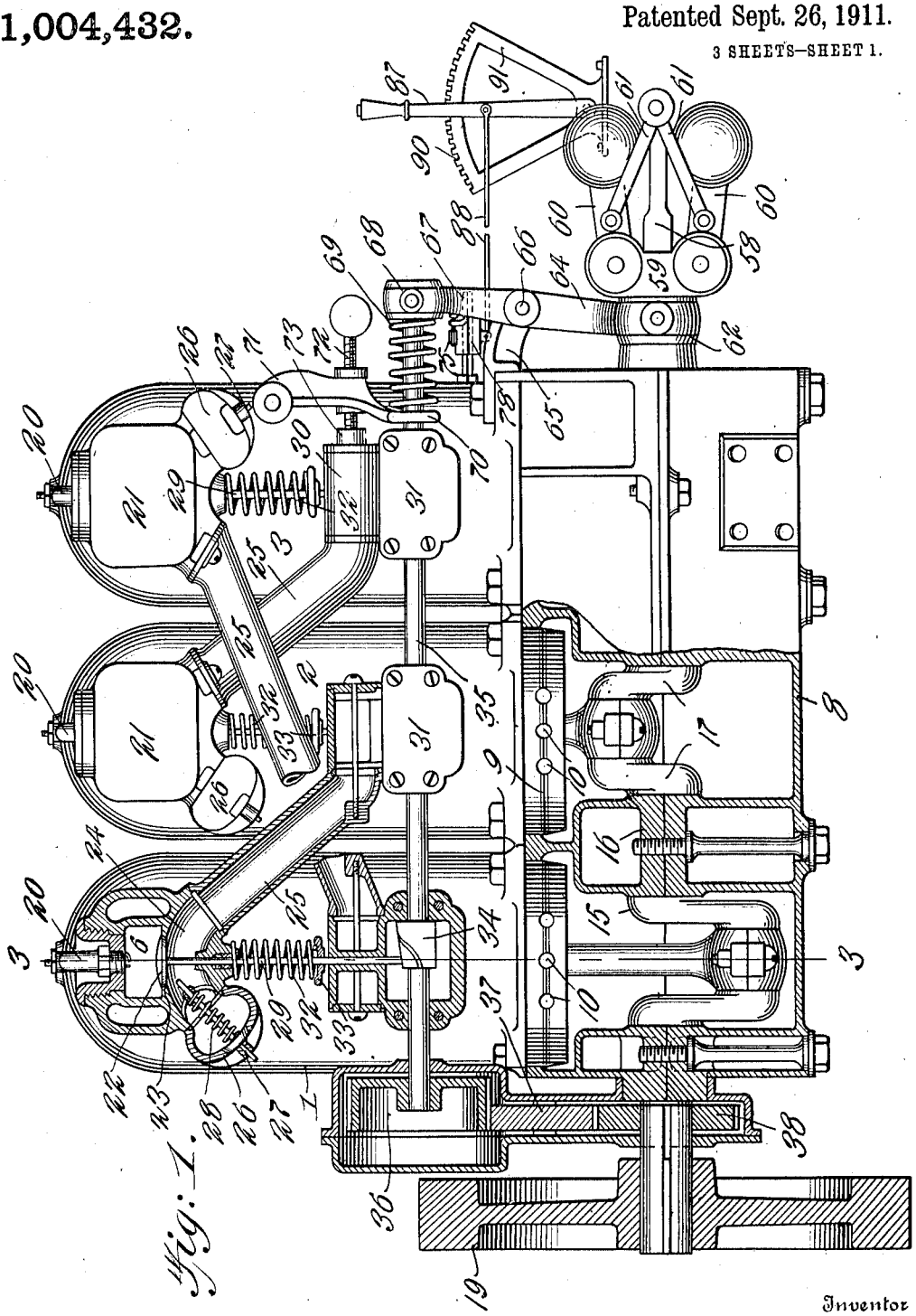

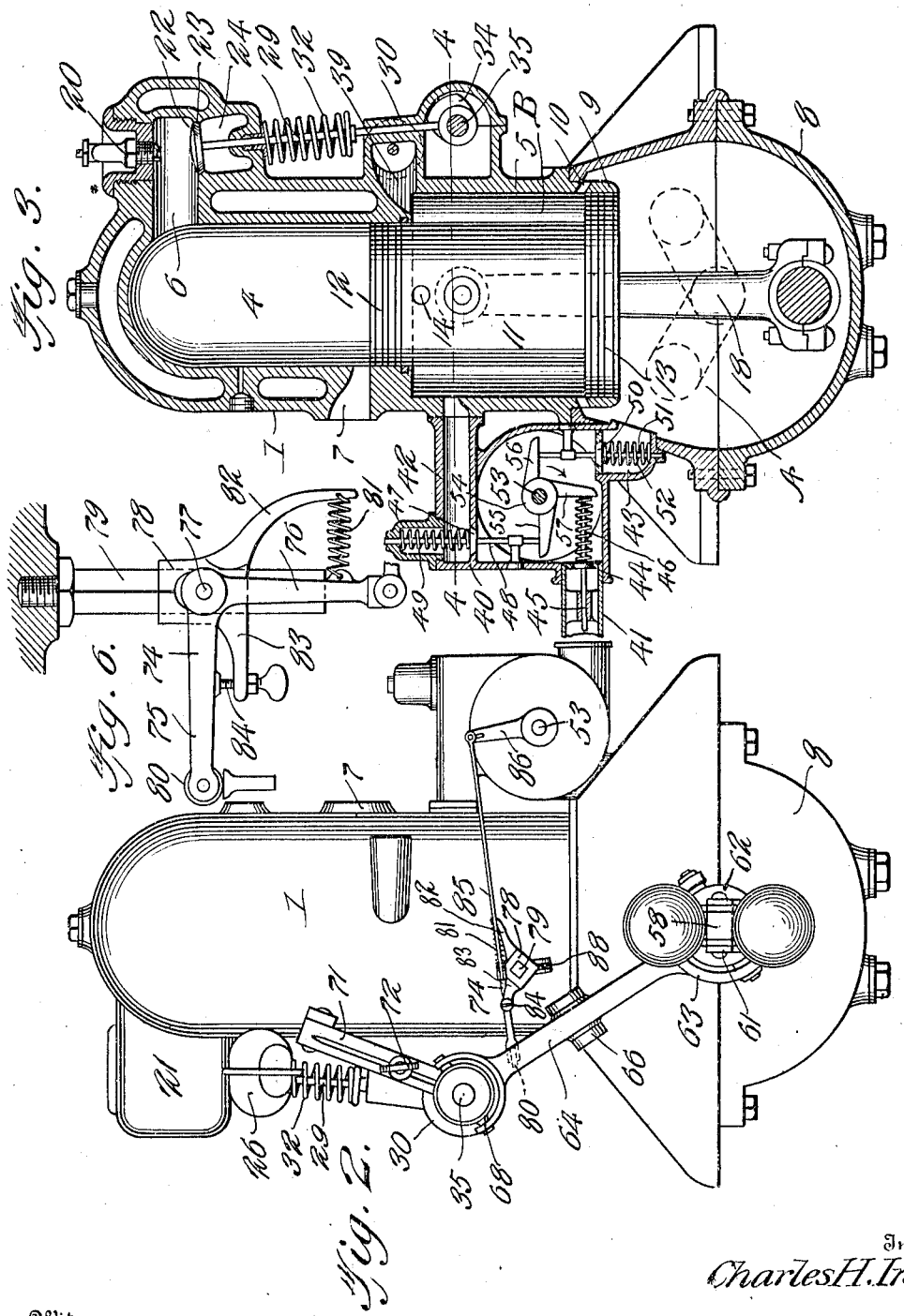

1,004,432.

Patented Sept. 26, 1911.

3 SHEETS—SHEET 3.

Inventor
Charles H. Inman,
By Victor J. Evans,
Attorney

Witnesses
Frank B. Hoffman
C. C. Hines

UNITED STATES PATENT OFFICE.

CHARLES H. INMAN, OF TRENTON, NEW JERSEY.

INTERNAL-COMBUSTION ENGINE.

1,004,432.     Specification of Letters Patent.     Patented Sept. 26, 1911.

Application filed August 17, 1909. Serial No. 513,213.

*To all whom it may concern:*

Be it known that I, CHARLES H. INMAN, a citizen of the United States, residing at Trenton, in the county of Mercer and State of New Jersey, have invented new and useful Improvements in Internal-Combustion Engines, of which the following is a specification.

This invention relates to improvements in internal combustion engines of the two-cycle type, the main object of the invention being to provide automatic means for scavenging the cylinder, main inlet valve and associated parts of the engine by the admission of pure or uncharged air to cool and flush the cylinder and charge inlet connections after the explosion of a charge and to displace all the foul gases and products of combustion left remaining at the last revolution of the engine, thus preventing the retention and deposit of spent products liable to weaken the subsequent charge or otherwise interfere with the perfect operation of the engine.

A further object of the invention is to provide means for scavenging at all speeds within the capacity of the engine without waste of the fuel charge and which avoids and prevents back firing, and also to provide a construction whereby proper charges of pure air and the explosive mixture may be automatically supplied and controlled through the action of the piston without liability of a commingling and weakening of either charge.

A still further object of the invention is to provide a multi-cylinder engine in which the timed admission of the scavenging and explosive charges to each cylinder is controlled by the action of the piston of one of the associated cylinders.

A still further object of the invention is to provide means for securing a greater volume of fuel charge, a better scavenging effect, a larger number of power impulses and a higher degree of power at low speed than two or four cycle engines of ordinary construction.

With these and other objects in view, the invention consists of the features of construction, combination and arrangement of parts hereinafter fully described and claimed, reference being had to the accompanying drawings, in which:—

Figure 4:
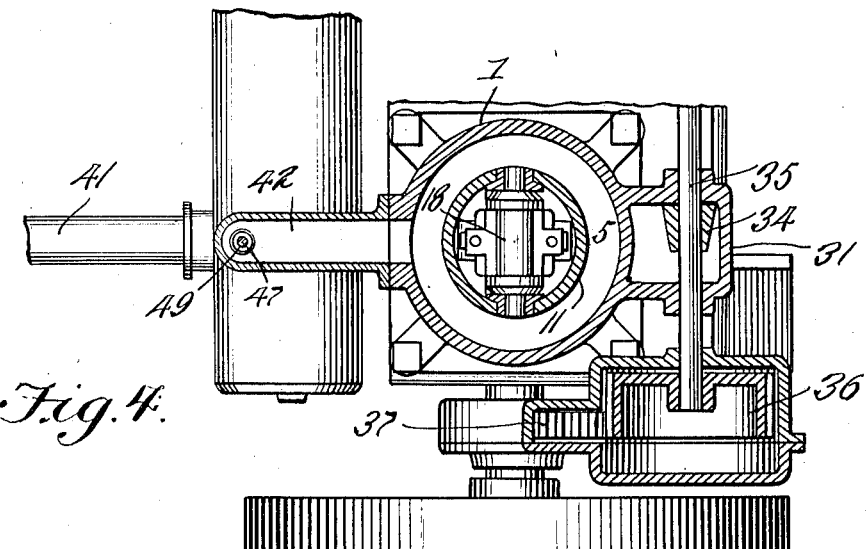
Figure 5:
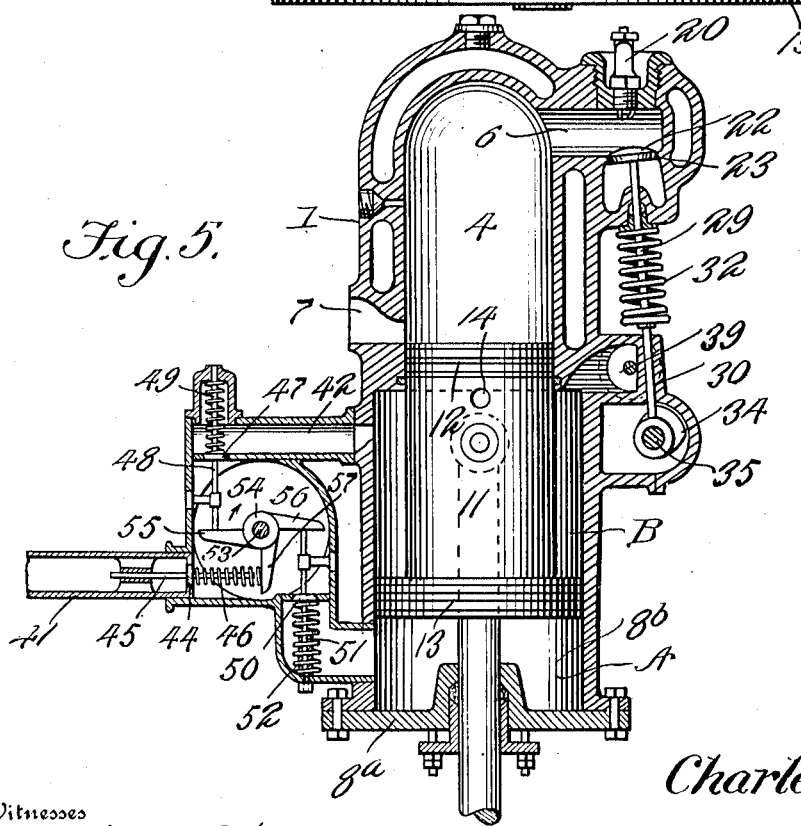

Figure 1 is a front elevation, partially in section, of a three-cylindered two-cycle engine embodying my invention. Fig. 2 is an end elevation of the same. Fig. 3 is a central section through one of the cylinders taken on line 3—3 of Fig. 1. Fig. 4 is a horizontal section taken on line 4—4 of Fig. 3. Fig. 5 is a view similar to Fig. 3 of a modified form of engine designed for the use of producer gas. Fig. 6 is a top plan view of parts of the speed regulator or throttling device.

In the drawings, I have, for convenience, illustrated my invention as embodied in a three-cylindered, two-cycle engine, although it may be used with one, two, three or more cylinders, either singly or opposed, and with any suitable means to preliminarily compress the explosive mixture and effect the scavenging operation, as hereinafter described.

The cylinders 1, 2 and 3 are in general similar in construction, so that a description of one will suffice for all. Each cylinder is provided with an upper main bore or explosion chamber 4 and a lower counterbore or pump chamber 5 of relatively greater capacity than said explosion chamber, the latter being provided at its upper end with a fuel inlet port or passage 6 and at its lower end with an exhaust port 7. Secured to the lower end of the cylinder is a crank casing 8 into which the lower extremity of the cylinder extends to provide a guide flange or pilot portion 9, in which are formed by-passes or ports 10 affording communication between the chamber 5 and crank casing. Operating in the cylinder is a duplex piston 11 comprising a hollow body provided at its upper end with packing rings 12 to engage the wall of the bore 4 and form a power or impulse piston head or member working therein, and provided at its lower end with a portion 13 of larger diameter having packing rings to engage the wall of the counterbore 5 and forming a pump piston head or member working therein. The head 12 is adapted to control the exhaust port 7, and the hollow body of the piston is provided at a suitable angle to avoid communication with said exhaust port with one or more ports 14 to afford communication through said hollow body between the crank casing and the upper portion of the counterbore 5.

The crank casings 8 of the respective cylinders are suitably closed against communication with each other for compression of the fuel charges therein and to prevent leakage between them, as will be readily understood. The engine shaft 15 extends through the crank casings and is journaled in suitable bearings 16. The shaft is provided with cranks 17 which are coupled to the respective pistons by the usual connecting rods 18, said cranks being arranged at an angle of 120° to each other to provide for proper successive timed operations of the pistons in compressing the explosive charges and effecting the exhaust of the spent gases from the cylinders. The counterbore or chamber 5, which serves in connection with the associated crank casing as a storage reservoir and compression chamber for the fuel mixture, is made of relatively greater capacity than the explosion chamber 4 for supplying a comparatively large volume of the fuel mixture to the explosion chamber of the cylinder communicating therewith and to secure an effective variation and equalization of pressure between the fuel mixture and admitted current of pure air for the automatic scavenging operation, hereinafter described.

The crank shaft is provided at one end with the usual fly wheel 19. Projecting into the admission port or passage 6 of each cylinder is an igniter 20 which may be of any suitable construction and, if of the spark type, controlled in any preferred manner, and communicating with the passage 6 is a valve casing 21 containing the main inlet valve 22, directly controlling the admission of the fuel mixture to the cylinder. The valve is adapted to close a feed port 23 affording communication between the passage 6 and a transverse passage 24, connected at one side with a by-pass or conduit 25 and at its opposite side with a scavenging valve casing 26, which latter is provided with an air inlet normally closed by an inwardly opening valve 27 held closed by a spring 28. The valve 22 is arranged to seat flush with one of the walls of the passage 24 and is carried by a stem 29 mounted to slide vertically in the casing 21 and through an underlying chamber or pocket 30 and extends at its lower end into a casing 31 arranged immediately below said chamber or pocket 30, each valve 22 being normally held closed by a spring 32 bearing at its upper end against a portion of the casing 21 and at its lower end against a washer 33 on the valve stem. The said admission valves 22 of the respective cylinders are automatically opened at the proper period on the suction strokes of the respective impulse pistons by longitudinally tapered cams 34 engaging the lower ends of the stems and inclosed in the chambers 31, said cams being fixed upon a controlling rod or shaft 35 having a combined rotary and longitudinal sliding movement. On one end of said rod or shaft is mounted a gear wheel 36 meshing with an intermediate gear 37 receiving motion from a driving gear 38 keyed or otherwise fixed to the crank shaft 15, the gear 36 either having a feathered engagement with the rod 35 or being relatively wider than the gear 37 to maintain a meshing engagement with the latter in the sliding movements of the rod. By this construction, it will be seen that the inlet valves will be engaged and positively opened by the revolving cams which are arranged to open them at the proper time periods, and that by a longitudinal adjustment of the rod the degree of lift or opening movement of the valves may be regulated to supply more or less of the fuel mixture to the cylinders according to the speed of revolution of the engine. As shown, the valve casing 26 is arranged at an angle to direct the incoming air against the exposed surface of the valve 22 to keep said valve 22 cool.

In the application of the invention to a three-cylinder engine, as shown, I preferably provide a mode of connecting or compounding the by-pass pipes or conduits 25, so that the piston of one cylinder will effect the supply of fuel mixture as well as the supply of the scavenging current of air to another cylinder. In the present instance, the pipe 25 communicating with the inlet valve casing 21 of cylinder 1 leads from the box or chamber 30 of cylinder 2, while the pipe 25 communicating with the valve casing 21 of cylinder 2 leads from the box or chamber 30 of cylinder 3 and the pipe 25 communicating with the valve casing 21 of cylinder 3 leads from the box or chamber 30 of cylinder 1. The box or chamber 30 of each cylinder is in communication with the upper end of the counterbore or chamber 5 thereof through a port or passage 39.

The fuel charge or mixture is supplied to the engine cylinders from a manifold or main admission chamber 40 having an inlet 41 adapted for connection with a carbureter or mixer, and also having branches or passages 42 and 43 leading therefrom to the upper portions of the counterbore 5 and the crank casing 8. The inlet 41 is controlled by an inwardly opening throttle valve 44 carried by a sliding stem 45 adapted to be held closed by a coiled spring 46. Communication between the manifold and the branch or passage 42 is controlled by an upwardly movable valve 47 carried by a stem 48 and normally held closed by a spring 49, while communication between the manifold and passage 43 is controlled by a downwardly opening valve 50 carried by a sliding stem 51 and normally held closed by a coiled spring 52. A rock shaft 53 extends longitudinally within the manifold and carries a cam 54 for controlling the valves 47 and 50 associated with each cylinder, one of which cams being also employed to control the throttle valve 44. Each cam is provided with a pair of points or arms 55 and 56 to engage the valve stems 48 and 51 and the cam which also controls the throttle valve is provided with a third arm 57, the arrangement being such that when the cam is in normal position, as shown in Fig. 3, the valves 47 and 50 will be held closed by their springs, while upon a slight rocking movement of the cam in the direction of the arrow said valves will be opened to admit portions of the fuel charge into the upper portions of the counterbore and crank casing, while at the same time the throttle valve 44 will be forced closed by the arm 57 to cut off the feed of the fuel mixture temporarily so as to permit the contained mixture to flow to the counterbore and crank chamber and an equalization of the pressures to be secured therein. As shown, the stem 45 of the throttle valve is normally out of contact with the arm 57, while the spring 46 surrounds said stem between the valve and the arm and projects into contact with the arm beyond the inner end of the stem. By this construction the throttle valve is permitted to independently open for the normal feed of the fuel mixture into the manifold without interference from the cam and until the latter is rocked to open the two admission valves 47 and 50, at which time the arm 57 will compress the spring 46 and engage the stem 45 and hold the throttle valve closed until the cam is retracted to restore normal conditions.

On the opposite end of the crank shaft from the fly wheel 19 is mounted a governor comprising a stem 58 fixed to the shaft to rotate therewith and carrying a sliding sleeve 59 provided with weighted outwardly swinging arms 60 connected with the outer end of the stem by links 61. The sliding collar 59 is formed with an annularly grooved portion 62 to receive the usual studs or pins upon one of the forked ends or arms 63 of a lever 64 intermediately fulcrumed upon a bracket 65 fixed to the adjacent engine cylinder, as at 66. The other forked end or arm 67 of the lever, which latter is mounted to swing in a direction longitudinally of the engine, is provided with the usual studs or projections to engage an annularly grooved collar 68 mounted upon the adjacent end of the rod or shaft 35. It will thus be understood that the lever 64 is operated to move its arm 67 inwardly or outwardly through the action of the swinging arms of the governor to adjust the tapered cams 34 in and out to open the main inlet valves 22 to a greater or less extent dependent upon the speed of the engine, by which the proper amount of fuel mixture may be supplied to the engine cylinder. The rod 35 is normally maintained in position to engage the reduced ends of the cams 34 with the valve stems 29 by a coiled expansion spring 69 surrounding the rod 35 between the collar 68 and a presser foot 70 through which the rod extends, said spring also acting to oppose a determined resistance to the sliding movement of the rod. The presser foot is carried by a pivoted arm or bracket 71 having a threaded opening for the passage of a screw 72 swiveled in a socket 73 on some suitable portion of the adjacent engine cylinder 3, by which the bracket may be adjusted in and out to regulate the tension of the spring and thus control the action of the governor and the valve operating cams to vary the feed of the fuel mixture to the cylinders proportionate to the speed of the engine.

A regulator is provided by which the throttle valve 44 may be controlled to regulate the maximum speed of the engine. This regulator comprises an elbow or bell crank lever 74 pivotally mounted at the angle of intersection of its arms 75 and 76 upon a stud 77 carried by a bracket sleeve 78 having an angular bore and slidably and non-rotatably mounted upon an angular stationary shaft or stem 79 arranged upon an adjacent portion of the cylinder 3, the lever 74 being thus disposed to move in a plane substantially at right angles to the plane of movement of the lever 64. The arm 75 of the lever 74 carries at its free end a friction roller or contact device 80 arranged in the path of inward movement of the arm 67 of the lever 64, which roller is normally maintained in contact with said arm 67 by a spring 81 connecting the arm 76 of the lever 74 with an arm or extension 82 on the sleeve 78. On another arm or extension 83 from the sleeve 78 is mounted a set screw 84 serving as an adjustable stop to limit the outward movement of the arm 75 under the action of said spring. The arm 76 of the lever is pivotally connected by a rod 85 with a crank arm 86 fixed upon the exteriorly projecting end of the cam shaft 53. It will thus be understood that when the engine reaches the maximum speed for which the regulator is set, the lever 64 will sping the lever 74 to transmit motion to the rod 85 to the shaft 53, thereby rocking the cam 54 to open the admission and equalizing valves 47 and 50 and to close the throttle valve 44. The engine will, therefore, run at the maximum speed for a limited period or until its speed is reduced by the consequent reduction of the fuel supply, when, as soon as the speed falls below the maximum, the levers 64 and 75 will be retracted in an obvious manner to shift the cam back to the position shown in Figs. 3 and 5 and restore normal conditions. By means of the screw 84 the contact device 80 may be adjusted with relation to the lever 64 to secure a high degree of sensitiveness of controlling action. In order, however, to provide for a wide range of adjustment of the regulating lever to enable the engine to be set to run at different speeds, an adjusting device is provided for sliding the sleeve 78 in and out to further vary the position of said contact device 80 relative to the governor lever 64. This adjusting device consists of a controlling lever 87 pivotally connected with the sleeve 78 by a rod 88 and provided with a spring actuated locking pawl to engage teeth 90 upon a rack or toothed segment 91, said rack being provided with suitable indications along the row of teeth to indicate the positions of the lever for setting the regulator to control the engine for fast or slow speeds.

In the modified form of my invention shown in Fig. 5 which is particularly designed for using producer gas as the fuel element, the crank casing is dispensed with and the piston rod extends through a head 8ª at the lower end of the cylinder for exterior connection with the crank shaft. The lower end of the cylinder and counterbore in this construction are lengthened to provide a lower compression chamber 8$^b$ which serves the same function as the crank casing for the compression of the charge mixture and is connected in like manner with the manifold for the feed of the fuel mixture thereto. The depending lip 9 and the ports 10 are not necessary in this construction, as the ports 14 will permit the charge to pass freely enough from the chamber 8$^b$ to the upper portion of the counterbore.

Assuming that the engine is primed or in condition for normal operation and that the charge in cylinder 1 has been exploded and the piston therein has begun its working stroke, at which time the piston in cylinder 2 is on its compression stroke, it will be understood that the head 13 of the latter named piston, which on its previous suction action has drawn air through the valve 27 of cylinder 1 into the connecting by-pass 25, will force the charge of fuel mixture contained in the inner or upper portion of the counterbore 5 of cylinder 2 into said by-pass, at the end of which operation the main inlet valve 22 of cylinder 1 will be opened by its actuating cam. The valve 27 of cylinder 1 being closed, and the charge of fuel mixture being preceded by a column of air in the by-pass 25, the air will first be forced through the port 23 and passage 6 into the chamber 4 of cylinder 1, thus flushing and cooling the inlet valve and cylinder and at the same time forcing ahead of it and out through the exhaust port 7 the products of combustion left remaining from the exploded charge. When the charge in cylinder 2 is fired and the piston therein is on its working stroke, the piston head 13 creates a partial vacuum in the inner or upper portion of the counterbore 5 of said cylinder and the by-pass 25 leading to cylinder 1, by which the scavenging valve 27 of cylinder 1 is opened, allowing air to enter around the associated valve 22 and flow into the by-pass 25 and into the upper portion of the counterbore 5 of cylinder 2, which is preferably of twice the area of the explosion chamber 4 of said cylinder. The by-pass 25 will accordingly be filled with a confined column of pure air, a portion of which may lie as a thin top strata or layer upon the body of fuel mixture in the counterbore 5 of cylinder 2, whereby upon the subsequent stroke of the piston in said cylinder the confined column of air will be forced through the admission port and into the explosion chamber of cylinder 1 as previously described, which column of air will be followed by a charge of the explosive mixture, thus priming cylinder 1 for the succeeding power operation thereof.

It will be understood from the foregoing description that the counterbore and crank casing of each cylinder serves as a storage and compression reservoir for another cylinder, the counterbore and crank casing of cylinder 2, for instance, performing such function for cylinder 1, and that the piston head 13 of the double piston of cylinder 2 acts as the compression and feeding medium by which the scavenging column of pure air and the succeeding charge of fuel mixture are supplied to the cylinder 1. The operation in this connection will be readily understood by the relative arrangement of the by-pass pipes 25, whereby such coöperation between the respective cylinders is established, the suction strokes and expelling strokes of the compression and feed piston members 13 being properly timed by the arrangement of the cranks. It will be observed that while the main inlet valves 22 are positively opened by the cams 34, they are also free to open when any variation of pressure exists between that in the explosion chambers and by-passes in order to establish a proper equalization of pressure for a sensitive action of the engine.

In other words, the counterbore, crank casing and piston head 13 of each cylinder serve as a pump for compressing and supplying the fuel mixture to the explosion chamber of another cylinder, said piston 13 subdividing the pump casing into a lower outer or primary compression chamber A and an upper inner or secondary combined mixing and compression chamber B, which chambers are respectively formed in the preferred structure by the counterbore 5 and casing 8, and in the modified structure by the lower and upper portions of the counterbore. For convenience of designating these chambers in the claims, said chambers may be respectively termed outer and inner chambers, which will include their arrangement in a horizontal engine structure.

As the piston in each cylinder is forced downward on its power stroke the head 12 confines the expanded charge until it nears the limit of its downward movement, when it unmasks the port 7 for the discharge of the spent gases and the following column of pure air. On the upward movement of the piston, the head 12 masks the port 7 and then compresses the charge in the chamber 4 up to the explosion point. On the downward movement of the piston the lower head 13 displaces a portion of the charge from the casing 8, into the counterbore 5, augmenting the pressure in the latter to a point above atmospheric pressure, and at the same time by its suction action on such stroke creates a partial vacuum in the connecting by-pass 25 and channel 42, valve 47 having a spring somewhat weaker than valve 27, permitting an inflow when passage 42 is unmasked, thus drawing in a charge of pure air through the associated scavenging valve 27 and opening the valve 47 for an inflow of the fuel mixture. When the head 13 finally moves downward into engagement with the pilot portion 9, the by-pass or relief ports 10 are opened or unmasked simultaneously with the unmasking of the port 14, by which a portion of the charge in the crank casing under its excess pressure passes up through the hollow body of the piston beneath the head 12 and cools the same and also passes through the port 14 into the upper portion of the chamber 5, while at the same time the communication established between the crank casing and the counterbore through the ports 10 allows free passage of the fuel mixture between them until the pressures are equalized. The piston having reached its extreme downward movement starts on the return or compression stroke and the ports 10 and 14 being now masked a vacuum begins in the crank case at which time the valve 50 will open to permit flow of fuel from the manifold into the crank casing. On the upward movement of the piston, the head 12 will compress the charge in the chamber 4, while the head 13 will scavenge and charge the explosion chamber of the associated cylinder. It will be apparent that the supply of pure air and fuel mixture to each cylinder will continue until there is an equalization of pressure in the cylinder and connecting by-pass 25, when upon a slight augmentation of pressure in the cylinder the main inlet valve 22 will be closed.

In addition to the scavenging effect obtained by my construction, which will be equally efficient under all speeds of operation of the engine, it will be seen that the mode of compressing and feeding the scavenging current and fuel mixture in the compressing chambers of each cylinder results in a cooling of the walls of the cylinder as well as in provision being made for the supply of a larger volume of fuel mixture to each cylinder, by which a larger number of high power impulses is secured. By also providing the two compression chambers A and B and equalizing the pressures therein on the in and out suction strokes of the piston 13, a thorough and effective, as well as sensitiveness of feed action, of the fuel mixture is attained, a proper compression action insured, the length of stroke of the piston increased and the piston cushioned to an effective extent on its downward stroke, with a resulting higher degree of efficiency and greater degree of economy in the operation of the engine. As a column of free air is normally contained in each by-pass pipe, this column of air will act as an insulating medium between the cylinder and fuel storage chamber to prevent any possibility of back firing.

It will be seen that in addition to providing an effective construction of means for automatically controlling the admission valves to supply more or less fuel to the cylinders according to the speed of the engine, I also provide an effective construction of means for cutting off the supply of fuel to the manifold or admission chamber and at the same time relieving the compression in the crank cases and counter-bores of the cylinders. This allows very close regulation of speed, as the charge may be admitted at any time within one half of one revolution of the engine, rendering the latter especially available for such purposes as require a constant even speed of the engine regardless of the load. The speed may further be varied at will by moving the regulator which is acted upon by the governor through its connection. The regulator may be set to run the engine at any given speed and to close the intake valve to the carbureter automatically when such speed is reached or exceeded. The same movement of the regulator, as before described, actuates the equalizing cams controlling the valves between the manifold and storage chambers, permitting the fuel mixture to pass from one to the other without waste or undue pressure through the established equalizing action. As soon as the speed falls below the maximum limit, the relief valves close and the intake valve is automatically released for operation.

It will be observed that the igniter is so arranged that it will also be cooled and cleaned by the scavenging current of air, whereby the parts of the engine will be maintained in condition for the reception of a good clean charge on each revolution, allowing high speed and power to be obtained.

I claim:—

1. An explosive engine including an explosion cylinder having a piston operating therein and provided with an admission port and an exhaust port, a pump cylinder having outer and inner compression chambers, the latter communicating with said admission port, a fuel supply chamber, independent suction-valved fuel inlets in direct communication between said fuel supply chamber and the respective compression chambers, a throttle valve controlling the feed of fuel from a suitable main source of supply to said supply chamber, a piston working in said pump cylinder and operative on its strokes to open the throttle valve and to alternately open the suction-valved fuel inlets and on its inward stroke to force the charge from the inner compression chamber to and through the admission port, and means operative on the outward stroke of the pump piston to establish communication between said compression chambers.

2. An explosive engine including an explosion cylinder having a piston operating therein and provided with an admission port and an exhaust port, a spring-closed valve controlling said admission port, a pump cylinder having outer and inner compression chambers, a duct connecting said admission port with the inner compression chamber, a spring-closed valve for admitting air into said duct, suction-valved fuel inlets communicating with said compression chambers, a piston working in said pump cylinder and operative on its outward stroke to draw air into said duct, compress the charge in the outer compression chamber and open the suction-valved inlet to the inner compression chamber and operative in its inward stroke to open the suction-valved inlet to the outer compression chamber and force the column of air in the duct with a following charge of fuel from the inner compression chamber through said duct and admission port to the explosion cylinder, and means operative on the outward stroke of said pump piston to establish communication between said compression chambers.

3. An explosion engine including an explosion cylinder having a piston operating therein and provided with admission and exhaust ports, a pump cylinder having outer and inner compression chambers, the latter communicating with said admission port, fuel inlets communicating with the respective compression chambers, spring-closed valves controlling said inlets and adapted to be alternately opened and closed, and a piston working in said pump cylinder and controlling said valves and provided with means for establishing communication between said chambers on the outward stroke thereof.

4. An explosive engine including an explosion cylinder having a piston operating therein and provided with admission and exhaust ports, a pump cylinder having outer and inner compression chambers, the latter communicating with said admission port, suction-valved fuel inlets communicating with the respective compression chambers, and a piston working in said pump cylinder and operating on its strokes to alternately open the suction-valved inlets and upon its inward stroke to force the charge from the inner compression chamber through said admission port into the explosion cylinder, said piston being provided with a passage opened upon its outward stroke to establish communication between the compression chambers.

5. An explosive engine including an explosion cylinder having a piston operating therein and provided with admission and exhaust ports, a pump cylinder having outer and inner compression chambers, the latter communicating with said admission port, suction-valved fuel inlets communicating with the respective compression chambers, and a piston working in said pump cylinder and operating on its strokes to alternately open the suction-valved inlets and upon its inward stroke to force the charge from the inner compression chamber through said admission port into the explosion cylinder, said piston having a hollow body communicating with one of said compression chambers and a port unmasked on the outward stroke of the piston to afford communication between said hollow body and the other compression chamber.

6. An explosive engine including an explosion cylinder having a piston operating therein and provided with admission and exhaust ports, a pump cylinder having outer and inner compression chambers, said inner compression chamber communicating with said admission port and having the outer end of its wall projecting into and spaced from the wall of the outer compression chamber and provided with pressure equalizing ports, independent suction-valved fuel inlets communicating directly with the respective compression chambers, and a piston working in said pump cylinder and operating on its strokes to alternately open the suction-valved inlets and upon its inward stroke to force the charge from the inner compression chamber through the admission port to the explosion cylinder, said piston comprising a hollow body of less diameter than the inner compression chamber and provided at its inner end with a port unmasked at the limit of outward movement of the piston and at its outer end with a head movable in said chamber and controlling said pressure equalizing ports, whereby communication between the compression chambers will be established upon the limit of outward movement of said pump piston.

7. An explosive engine including an explosion cylinder having a piston operating therein and provided with admission and exhaust ports, a pump cylinder having outer and inner compression chambers, said inner compression chamber communicating with said admission port and having the outer end of its wall projecting into and spaced from the outer admission chamber and provided with pressure equalizing ports, suction-valved fuel inlets communicating with said compression chambers, and a piston working in said pump cylinder and operating on its strokes to alternately open the suction-valved inlets and upon its inward stroke to force the charge from the inner compression chamber through the admission port to the explosion cylinder, said piston having a hollow body in normal communication with the outer compression chamber and formed with a port unmasked at the limit of the outward movement thereof to afford communication between the hollow body and inner compression chamber, and having a head of enlarged diameter movable in the inner compression chamber and controlling said pressure equalizing ports.

8. An explosive engine including an explosive chamber having a piston operating therein and provided with admission and exhaust ports, a pump cylinder having outer and inner compression chambers, the latter communicating with said admission port, fuel inlets communicating with the respective compression chambers, a piston working in said pump cylinder, spring-closed valves controlling said fuel inlets and automatically opened upon the inward and outward strokes of the piston, a source of fuel supply communicating with the inlets, a spring-closed valve adapted to be opened by the suction action of the piston and controlling communication between said source of fuel supply and said fuel inlets, and a regulator automatically operative when a determined speed is exceeded to open said fuel inlet valves and close the last-named valve and normally arranged to permit free opening movement of the valves.

9. An explosive engine including an explosion cylinder having a piston operating therein and provided with admission and exhaust ports, a pump cylinder having outer and inner compression chambers, the latter communicating with said admission port, a piston operating in said pump cylinder and normally closing communication between said chambers and operative on its outward stroke to open communication therebetween, fuel inlets communicating with the compression chambers, spring-closed valves controlling said inlets and adapted to be alternately opened on the strokes of the piston, a source of fuel supply communicating with said inlets, a spring-closed throttle valve controlling the feed of fuel to said valved inlets from said source of fuel supply and adapted to be opened by the suction action of the piston, and a regulator arranged to normally permit free opening movement of the throttle valve and adapted when a determined speed is exceeded to automatically open said fuel inlet valves and close said throttle valve.

10. An explosive engine embodying a cylinder having a fuel admission port, a piston operating in said cylinder, a pump having a fuel chamber provided with an outlet, a valve casing communicating through a feed passage with said fuel chamber and said admission port, an admission valve controlling said admission port and arranged to seat substantially flush with one of the walls of the passage a valved air inlet arranged at an angle to direct the incoming air against the exposed surface of the admission valve, a pipe connecting the outlet of the fuel chamber of the pump with the side of the valve casing diametrically opposite said air inlet, a fuel inlet to said fuel chamber of the pump and a piston in said fuel chamber operating on its suction stroke to open the valved air inlet and draw air into said pipe and upon its working stroke to force the air and a fuel charge from said pipe and through said fuel admission port into the cylinder.

11. An explosive engine including an explosion cylinder having a fuel admission port, a pump cylinder provided with outer and inner compression chambers, a feed duct connecting the inner compression chamber with the fuel admission port, a spring-closed admission valve controlling the admission port, a spring-closed air inlet valve communicating with the feed duct, a piston operating in the pump cylinder and separating the compression chambers and adapted on its outward movement to open communication between said chambers and open said air inlet valve and on its inward movement to force the charge from the inner compression chamber with the air in the feed duct through said admission valve into the explosion cylinder, a manifold having fuel feed passages leading to the compression chambers, spring-closed suction valves controlling said passages and adapted to be alternately opened by the suction induced by the pump piston on its inward and outward movements, the closing spring of the suction valve controlling the inlet passage to the inner compression chamber being weaker than the closing spring of the air inlet valve, and automatic means for periodically positively opening the valve controlling the admission port and adapted to permit independent opening movement thereof under variations of pressure in the explosion cylinder and feed duct.

12. An explosive engine comprising an explosion cylinder having a fuel admission port, a pump cylinder provided with outer and inner compression chambers, a feed duct connecting the inner compression chamber with the fuel admission port, a spring-closed admission valve controlling the admission port, a spring closed air inlet valve communicating with the feed duct, a piston operating in the pump cylinder and separating the compression chambers and adapted on its outward movement to open communication between said chambers and open said air inlet valve and on its inward movement to force the charge from the inner compression chamber with the air in the feed duct through said admission valve into the explosion cylinder, a manifold having fuel feed passages leading to the compression chambers, spring-closed suction valves controlling said passages and adapted to be alternately opened by the suction induced by the pump piston on its inward and outward movements, the closing spring of the suction valve controlling the inlet passage to the inner compression chamber being weaker than the closing spring of the air inlet valve, a source of fuel supply communicating with the manifold, a spring-closed suction valve controlling the same, a regulator automatically operative when a determined speed of the engine is exceeded to close the last-named valve and open the valves controlling the fuel feed passages and adapted to normally permit said valves to have independent opening movement, and automatic means for periodically positively opening the valve controlling the admission port and adapted to permit independent opening movement thereof under variations of pressure in the explosion cylinder and feed duct.

13. In an explosive engine, an explosion cylinder having a piston operating therein and provided with an admission port and an exhaust port, a pump cylinder having inner and outer compression compartments, the former being provided with a fuel outlet communicating with the admission port of the explosion cylinder, fuel inlets communicating with the respective compartments, a piston operating in said pump cylinder and separating said compartments, means controlled by the piston for bringing said compartments into communication, a fuel supply chamber communicating with the fuel inlets, valves controlling said inlets, a source of fuel supply, an intake valve controlling the feed of fuel therefrom to said fuel supply chamber, said valve being adapted to open under the suction action of the piston, and a governing device for opening said inlet and intake valves, said intake valve adapted to open independently of said device.

14. An internal combustion engine including a cylinder provided with an explosion chamber having an admission port and an exhaust port, a valve controlling said admission port, a pump comprising a cylinder and a piston, said pump cylinder having inner and outer compression chambers separated by said piston, a fuel supply pipe leading from the inner compression chamber of the pump cylinder to the admission port of the engine cylinder, a valve communicating with said pipe for admitting air into said pipe during the outward stroke of the pump piston, a fuel chamber in communication through fuel feed passages with the said inner and outer compression chambers, valves controlling said passages, and adapted to be alternately opened by the suction action of the pump piston on the inward and outward strokes of said piston, a valved fuel inlet to said fuel chamber, means for controlling the admission valve, said means operating to normally permit opening movement of said admission valve on the outstroke of the pump piston and to hold said valve closed when the valves controlling the fuel feed passages are open, and means for establishing communication between the compression chambers on the outstroke of the pump piston.

In testimony whereof I affix my signature in presence of two witnesses.

CHARLES H. INMAN.

Witnesses:
HARRY BURSLEM,
WILLIAM J. CONNOR.